US009082169B2

(12) United States Patent
Thomson et al.

(10) Patent No.: US 9,082,169 B2
(45) Date of Patent: Jul. 14, 2015

(54) LONGITUDINAL MONITORING OF PATHOLOGY

(75) Inventors: Rowena Thomson, Kirchheim (DE); Rainer Lachner, Munich (DE)

(73) Assignee: Brainlab AG, Feldkirchen (DE)

( * ) Notice: Subject to any disclaimer, the term of this patent is extended or adjusted under 35 U.S.C. 154(b) by 124 days.

(21) Appl. No.: 13/988,350

(22) PCT Filed: Dec. 1, 2010

(86) PCT No.: PCT/EP2010/068645
§ 371 (c)(1),
(2), (4) Date: May 20, 2013

(87) PCT Pub. No.: WO2012/072129
PCT Pub. Date: Jun. 7, 2012

(65) Prior Publication Data
US 2013/0243287 A1 Sep. 19, 2013

(51) Int. Cl.
*G06T 7/00* (2006.01)
(52) U.S. Cl.
CPC .............. *G06T 7/0012* (2013.01); *G06T 7/0081* (2013.01); *G06T 7/0087* (2013.01); *G06T 2207/30016* (2013.01)
(58) Field of Classification Search
USPC ......... 382/100, 128, 130, 131, 132, 181, 190, 382/195, 203, 224–228; 128/922; 378/4–27
See application file for complete search history.

(56) References Cited

U.S. PATENT DOCUMENTS

| | | | |
|---|---|---|---|
| 5,187,658 A * | 2/1993 | Cline et al. ..................... 382/128 |
| 5,617,459 A * | 4/1997 | Makram-Ebeid et al. ...... 378/62 |
| 6,566,687 B2 * | 5/2003 | Andry et al. .................... 257/66 |
| 6,788,816 B1 | 9/2004 | Kiyuna |
| 7,136,518 B2 * | 11/2006 | Griffin et al. ................. 382/133 |
| 7,885,438 B2 * | 2/2011 | Uppaluri et al. .............. 382/128 |
| 8,050,734 B2 * | 11/2011 | Miller et al. ................... 600/407 |
| 8,503,747 B2 * | 8/2013 | Park et al. ...................... 382/128 |

(Continued)

FOREIGN PATENT DOCUMENTS

| | | |
|---|---|---|
| EP | 1 768 062 | 3/2007 |
| EP | 1 868 157 | 12/2007 |

OTHER PUBLICATIONS

International Search Report for International Application No. PCT/EP2010/068645 dated May 19, 2011.

(Continued)

*Primary Examiner* — Anand Bhatnagar
(74) *Attorney, Agent, or Firm* — Tucker Ellis LLP

(57) ABSTRACT

The present invention relates to a method for processing image data comprising image information about a body region of a patient, the method being at least partly executed by an electronic data processing device and comprising the following steps: d) providing the image data; e) assigning, to elements of the image information, a predetermined probability for the image information contained in the respective element representing a predetermined tissue class, wherein the predetermined probability is provided independently of information about at least part of a body which is different from the body of the patient; f) determining, on the basis of the predetermined probability and for a subset of the image information comprising a plurality of the elements, an element-specific probability for individual elements of the subset representing an element-specific tissue class.

15 Claims, 4 Drawing Sheets

(56) References Cited

U.S. PATENT DOCUMENTS

2003/0103665 A1* 6/2003 Uppaluri et al. ............. 382/131
2004/0013292 A1* 1/2004 Raunig ........................ 382/128
2009/0324046 A1* 12/2009 Kruger et al. ................ 382/131

OTHER PUBLICATIONS

Desco et al., "Statistical segmentation of multidimensional brain datasets", Proceedings of SPIE, vol. 4322, No. Part 01-03, Feb. 2001, pp. 184-193.

Leemput et al., "A Unifying Framework for Partial Volume Segmentation of Brain MR Images", IEEE Transactions on Medical Imaging, vol. 22, No. 1, Jan. 2003, pp. 105-119.

Rainer Lachner, "Rigid Registration of Medical Images by Maximization of Mutual Information", From Nano to Space: Applied Mathematics Inspired by Roland Bulirsch, Jan. 2008, pp. 71-90.

Moon et al., "Model-Based Brain and Tumor Segmentation", Pattern Recognition, 2002, Proceedings 16$^{th}$ International Conference on Quebec City, Canada, Aug. 2002, vol. 1, pp. 528-531.

* cited by examiner

LONGITUDINAL MONITORING OF PATHOLOGY

This application is a national phase of International Application No. PCT/EP2010/068645 filed Dec. 1, 2010 and published in the English language.

The present invention is directed to a method for processing image data comprising information about a body region of a patient. Within the framework of this method, the image data which has been preferably obtained by using a medical imaging modality is analyzed in order to determine types of tissue which are represented by the image information. In particular, the inventive method may be employed for determining variations in the distribution of tissue types within the body region, for example when determining tumour growth.

Moon et al., Model-Based Brain and Tumor Segmentation, International Conference on Pattern Recognition, August 2002, pages 528-531 proposes a method of combining image segmentation based on statistical classification with a geometric prior using a probabilistic geometric model of sought structures for segmentation of brain tissue and tumours from three-dimensional magnetic resonance images. Their method uses a spatial statistical atlas as a prior in the classification which is modified to include prior probabilities for tissue classes representing tumour and edema. A prior is understood to denote start information for a determination and/or computing algorithm. In particular, the prior comprises a start probability for a probabilistic approach used for determining the tissue classes. It is proposed to use a spatial class from the statistical parametric mapping (SPM) package for initialisation of the method and classification of the tissue. Such an atlas contains spatial probability information for brain tissues. The atlas was created by averaging hand segmentations of normal patients that have been registered by an affine transformation. The atlas needs to be registered to the patient data which such a transformation in order to provide spatial prior probabilities for the tissue classes in the patient. However, the atlas is a normal brain atlas, and cannot be used directly in the presence of pathology.

It is thus a problem to be solved by the invention to provide a method of segmentation of images comprising information about tissues which does not require to provide such a spatial atlas.

This problem is solved by the subject-matter of any appended independent claim. Advantages, advantageous features, advantageous embodiments and advantageous aspects of the present invention are disclosed in the following and contained in the dependent claims. Different advantageous features can be combined between the embodiments as long as technically sensible and feasible.

The inventive method for processing image data comprising information about a body region of a patient is preferably at least partly executed by an electronic data processing device, in particular a microprocessor and/or a computer. That is, all steps or just some of the steps (i.e. less than the total number of steps) of the inventive method may be executed by an electronic data processing device.

The method in accordance with the invention is in particular a data processing method. The data processing method is preferably performed using technical means, in particular a computer. The computer in particular comprises a processor and a memory in order to process the data, in particular electronically and/or optically. The calculating steps and determining steps described are in particular performed by a computer. Determining or calculating steps are in particular steps of determining data within the framework of the technical data processing method, in particular within the framework of a program. A computer is in particular any kind of data processing device, in particular electronic data processing device. A computer can be a device which is generally thought of as such, for example desktop PCs, notebooks, netbooks, etc., but can also be any programmable apparatus, such as for example a mobile phone or an embedded processor. A computer can in particular comprise a system (network) of "sub-computers", wherein each sub-computer represents a computer in its own right. A computer in particular comprises interfaces in order to receive or output data and/or perform an analogue-to-digital conversion. The data are in particular data which represent physical properties and/or are generated from technical signals. The technical signals are in particular generated by means of (technical) detection devices (such as for example devices for detecting marker devices) and/or (technical) analytical devices (such as for example devices for performing imaging methods), wherein the technical signals are in particular electrical or optical signals. The technical signals in particular represent the data received or outputted by the computer.

Preferably and in particular as the first step of the inventive method, the image data is provided. The image data is also called input image data and is preferably not preprocessed. In particular, the input image data is in a raw data format or the format output by the imaging device used for generating the input data, respectively.

The expression "providing data" in particular encompasses (within the framework of a data processing method) the scenario in which the data are determined by the data processing method or program. The meaning of "providing data" in particular also encompasses the scenario in which the data are received by the data processing method or program, for example from another program or a data storage medium, in particular for further processing by the data processing method or program. Thus, "providing data" can also for example mean waiting to receive data and/or receiving the data. The received data can for example be inputted via the interface. "Providing data" can also mean that the data processing method or program performs steps in order to (actively) acquire the data from a data source, for instance a data storage medium (such as for example a ROM, RAM, database, hard disc, etc.) or via the interface (for instance, from another computer or a network). The data can achieve the state of being "ready for use" by performing an additional step before the providing step. In accordance with this additional step, the data are generated in order to provide the data. The data are in particular detected or captured (for example, by an analytical device). Alternatively or additionally, the data are inputted in accordance with the additional step, for instance via interfaces. The data generated can in particular be inputted (for instance, into the computer). In accordance with the additional step (which precedes the providing step), the data can also be provided by performing the additional step of storing the data in a data storage medium (such as for example a ROM, RAM, CD and/or hard drive), such that they are ready for use within the framework of the method or program in accordance with the invention. The providing step in particular does not involve an invasive step which would represent a substantial physical interference with the body requiring professional medical expertise to be carried out and entailing a substantial health risk even when carried out with the required professional care and expertise. The providing step in particular does not involve a surgical step and in particular does not involve a step of treating a human or animal body using surgery or therapy. This also applies in particular to any steps directed to determining data. Providing first data on the basis of second data means in particular that the second data are used by the method described herein to provide the first data. In order to distinguish the different data used by the method herein, the data are given names (i.e. called) like "XY data" and are defined by the information which they describe.

Preferably, the image data have been generated by using a medical imaging modality. According to very preferable embodiment, generating the image data takes place outside the inventive method, i.e. does not form a step of the inventive method. This has the specific advantage that the inventive method may be conducted after a generation of the image data, in particular the inventive method does not need to be executed at the point of time of applying the medical imaging modality to the body region. However, in accordance with another embodiment, generating the image data forms part of the inventive method. This may be used, for example, in the case of online processing of the image data at the instance of applying the medical imaging modality to the body region. It shall be emphasized, though, that the inventive method is designed to be flexible in its application with regard to the point of time of application of the medical imaging modality and thus the embodiment in which generating the image data does not form part of the inventive method is more preferred embodiment.

In the field of medicine, imaging methods are used to generate image data (for example, two-dimensional or three-dimensional image data) of anatomical structures (such as soft tissues, bones, organs, etc.) of the human body. Medical imaging methods are understood to mean advantageously apparatus-based imaging methods (so-called medical imaging modalities and/or radiological imaging methods), such as for instance computed tomography (CT), x-ray tomography, magnetic resonance tomography (MRT or MRI), conventional x-ray, sonography and/or ultrasound examinations, and positron emission tomography. Analytical devices are in particular used to generate the image data in apparatus-based imaging methods. The imaging methods are in particular used for medical diagnostics, to analyse the anatomical body in order to generate images which are described by the image data. The imaging methods are in particular used to detect pathological changes in the human body. However, some of the changes in the anatomical structure, in particular the pathological changes, may not be detectable and in particular may not be visible in the images generated by the imaging methods. A tumour for example represents an example of a change in the anatomical structure. If the tumour grows, it then represents an expanded anatomical structure. This expanded anatomical structure may not be detectable; in particular, it may occur that only a part of the expanded anatomical structure is detectable. Primary/high-grade brain tumours are for example usually visible on MRI scans when using contrast agents to infiltrate the tumour. The MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and in particular discernable in the image generated by the imaging method. In addition to these tumours, referred to as "enhancing" tumours, there are believed to be approximately 10% of brain tumours which are not discernable on an MRI scan and are in particular not visible to a user looking at the images generated by the imaging method.

The image data in particular comprises image information about a body region of a patient. This body region may consist of and/or comprise a specific body part of the patient such as a limb (i.e. an arm and/or a leg) or an organ (in particular, an internal organ such as the kidney or the liver or the brain). The body region can consist of and/or comprise soft and/or hard tissue, wherein the term of soft tissue may for example relate to skin or brain or muscular tissue and the term of hard tissue may for example relate to bone or cartilage tissue.

The image information comprises, preferably is made up of elements which are in particular discrete (for example pixels or voxels). The image information may be two-dimensional or three-dimensional image information, depending on whether the elements are represented by pixels or voxels. Preferably, each of the elements contains a specific image value, in particular a single specific image value which advantageously comprises colour information. The colour information comprises information about a value taken from a discrete colour scale which is contained in the image information or element, respectively. This value may for example be a grey value (grey scale value) or a colour value of a multicoloured colour scale in case the image information is not represented in a multicoloured colour scale (in contrast to a grey scale).

In a further, preferably second step of the inventive method, a predetermined probability is assigned to elements, in particular each element of the image information. This predetermined probability represents a measure for probability for the image information contained in the respective element representing a predetermined tissue class. The tissue class preferably indicates the type of tissue which is represented by the image information. Therefore, the predetermined probability preferably is a probability that the part of the image comprising the respective image information displays a certain type of tissue, e.g. hard tissue or soft tissue and/or a pathologic tissue (in particular, tumour tissue) or healthy tissue. The probability for the image information representing a certain tissue class may be based on for example the colour information, in particular on differences in colour information between neighbouring elements and/or on differences in colour information between subsets of the image information comprising a plurality of elements (in particular, at least two elements or more particularly, at least three elements). In other words, the inventive method determines a probability for an image element (in particular, a pixel and/or voxel) belonging to a specific tissue class.

Advantageously, the predetermined probability is provided independently of information about at least part of a body which is different from the body of the patient. That is, the predetermined probability is not provided on the basis of information contained in and/or taken from an atlas. Thus, the inventive method does not use an atlas prior such as, the above-mentioned state of the art, i.e. it is independent of standard anatomic and/or physiological data. Independent provision of the predetermined probability may be for example achieved by the two embodiments described in the following. The terminology of providing the predetermined probability independently of the mentioned information comprises the embodiment of using a probability which is provided on the basis of information gained from images of the specific patient's body and/or of assigning a neutral value to each element of the image information.

An atlas typically consists of a plurality of generic models of objects, wherein the generic models of the objects together form a complex structure. The atlas of a femur, for example, can comprise the head, the neck, the body, the greater trochanter, the lesser trochanter and the lower extremity as objects which make up the complete structure. The atlas of a brain, for example, can comprise the telencephalon, the cerebellum, the diencephalon, the pons, the mesencephalon and the medulla as the objects which make up the complex structure. One application of such an atlas is in the segmentation of medical images, wherein the atlas is matched to medical image data, and the image data are compared with the matched atlas in order to assign a point (a pixel or voxel) of the image data to an object of the matched atlas, thereby segmenting the image data into objects.

Preferably, the predetermined probability is provided on the basis of information, more preferably of image information received for the specific patient whose tissue shall be judged with the inventive method. Thus, the predetermined probability is a patient-specific predetermined probability and may according to a preferred embodiment be provided based on the result of tissue classification which is specific for the patient. In other words, the predetermined probability may be provided based on the result of classification of the specific patient's tissue into tissue classes. For example, image data which have been provided previously, for example in a previous session of imaging the specific patient's body region and/or at a previous step of treatment of the patient, may be used as a prior for the inventive method. This ensures that the image information used for providing the predetermined probability was taken from the patient who himself is the subject of the inventive method. This allows for a more accurate and patient-specific application of a segmentation algorithm to image data taken from a patient. Providing the predetermined probability based on a result of such previous tissue classification may be performed for only part of the elements of the image information, i.e. less than the total elements contained in the image information.

According to a more preferred embodiment, the predetermined probability is provided as a neutral value for all elements or part of the elements contained in the image information, in particular that part of the elements of the image information for which the predetermined probability may not be provided based on the result of previous tissue classification. The term of a neutral value encompasses a value which is uniform, i.e. the same for all elements. Furthermore, the neutral value is designed to be independent of physiological and/or anatomical characteristics of the specific patient's body and also independent of such characteristics of any other body which is different from the specific patient's body. Advantageously, the neutral value is a comparably low numeric value for the probability. This numeric value preferably is 1%, 5%, 10% or 20% (i.e. 0.01, 0.05, 0.10 or 0.20) and/or lies in an interval with a lower boundary of 5% and an upper boundary 20% (i.e. a lower boundary of 0.05 and an upper boundary of 0.20), preferably including the boundaries. This neutral value is advantageously distributed homogeneously, i.e. with a constant distribution, over the elements. The neutral value may be chosen for the specific patient or used as a generic value which is independent from the patient, e.g. as a (numeric) value which may be used for different individual patients or which is provided as a random probability.

As another, preferably third, step of the inventive method, an element-specific probability for the image information contained in individual elements is determined. The individual elements preferably are those elements to which the predetermined probability has been assigned. The element-specific probability is a probability for the image information contained an individual element representing an element-specific tissue class. The individual elements preferably are part of a subset of the image information, the subset in particular comprising a plurality, preferably at least two of the elements contained in the image information. The fact that the element-specific probability is determined for the image information contained individual elements means that the element-specific probability is determined for each of the elements, preferably independently of the probability determined for another one of the elements contained in the subset. The subset of the image information may consist of only part of the image information, i.e. not the total amount of image information. However, the subset may also contain the total amount of image information available about the body region. The element-specific probability preferably indicates the probability that image information contained in an individual element (in the following also denoted simply as an individual element) represents a tissue class specifically for that individual element. Thus, it is determined whether an individual element represents for example soft tissue or hard tissue and/or pathologic (in particular, tumourous) tissue or healthy tissue. This is preferably determined on the basis of the predetermined probability and for the above-mentioned subset of the image information. Thus, the predetermined probability is used as a start value (also called prior or prior probability or probability prior) for determining the tissue class which is represented by an individual element. Advantageously, the element-specific probability is determined for at least one element contained in the subset.

Preferably, the predetermined probability represents an expected value for the element-specific probability. In other words, the predetermined probability is a start estimate for the element-specific probability which is input preferably in an expectation-maximization algorithm. Such an algorithm is according to a preferred embodiment employed for determining the element-specific probability. That is, a likelihood for an individual element representing the element-specific tissue class is determined. This likelihood is in particular represented by a log-likelihood. Preferably, this likelihood is maximized.

Preferably, the likelihood for some or all of the elements contained in the subset representing a distribution of element-specific tissue classes is determined. This is preferably achieved by determining a combined probability which represents a distribution of conditional element-specific probabilities for the elements of the subset representing a specific distribution of tissue classes, in particular a distribution over the elements. Maximizing the likelihood preferably comprises repeating the third step of the method, i.e. the step of determining the element-specific probability for different individual elements and using these individual element-specific probabilities for determining the combined probability for those elements. Thus, the combined probability represents a conditional probability measure for a specific individual element representing a certain tissue class while at the same time one or more other individual elements represent one or more specific tissue classes. The element-specific probability in a preceding iteration of the third step is then preferably used as an expected value for the element-specific probability and a likelihood is determined for the respective individual element representing the element-specific tissue class. For repeating the step of determining the element-specific probabilities, the expected value for the element-specific probability which has for the first iteration of the inventive method been given by the predetermined probability is thus replaced by the element-specific probability determined in the preceding iteration, which is possible after the first iteration of the inventive method. For the first iteration, the predetermined probability is used as an expected value for the element-specific probability as described above.

The steps of determining the element-specific probabilities and the combined probability are repeated until the combined probability is maximized, that is until the combined probability preferably reaches a constant value for consecutive iterations of determining the combined probability. Alternatively, the condition for a maximized combined probability may be that the combined probability determined in consecutive iterations displays only a minor deviation from the combined probability determined in a previous iteration, in particular a deviation within a certain, advantageously predefined interval above and below the previously determined combined probability. This interval may be expressed as an absolute or relative deviation from the previously determined combined probability. An end criterion for maximizing the combined probability preferably is defined by a maximum number of iterations of repeating the steps of determining the element-specific probabilities and the combined probability (for example, 10, 20 or 30 iterations) and/or a relative increase of a likelihood (in particular, log-likelihood) represented by the combined probability. This relative increase preferably is less than for example 1% or 5% (i.e. 0.01 or 0.05) from one iteration to the next one in order to exit the respective steps. The combined probability may be regarded as being maximized when, for in particular consecutive iterations of determining the combined probability, the combined probability substantially no longer changes. Then, the inventive method preferably ends and a distribution of tissue classes represented by individual elements with the maximized combined probability is regarded as in particular a true image while the representation of the tissue contained in the body region. In other words, a distribution of tissue classes for elements contained in the image information is determined which most likely, i.e. with the highest probability, explains the image data provided for the body region.

The method described so far is also referred to as an "image data processing method for determining tissue distribution".

In the following, a preferred embodiment of the invention is described which relates to a way of using the image data processed with the above-described method.

Preferably, first image data is provided which has been determined, at a first point in time, by using a first medical imaging modality, wherein the first image data comprises information about the geometry of the body region. Furthermore, second image data are provided which have been determined, at the first point in time, by using a second medical imaging modality, wherein the second imaging modality is different from the first imaging modality and the second image data comprises information about the geometry of the body region. Then, third image data is provided which has been determined at a second point in time which is later in time than the first point in time. Determining the third image data is achieved by also using the first medical imaging modality which has already been used for the first image data. The third image data also comprises information about the geometry of the body region. Furthermore, fourth image data is provided which has been determined at the second point in time by using the second medical imaging modality which has already been determined at the second point in time by using the second medical imaging modality which has already been used for determining the second image data. The fourth image data also comprises information about the geometry of the body region.

Advantageously, the first image data is registered with the second image data in order to determine first co-registered image data. Registering the first image data with the second image data in particular means to transform both image data into a common coordinate system such as to make the image information conferred by the image data visually comparable. More particularly, the first and the second image data may be overlayed and for example distorted until comparable geometric features of the body region lye over one another. For example, landmarks may be used as comparable geometric features for determining the coordinate transformation.

A landmark is a defined position of an anatomical characteristic of an anatomical body part which is always identical or recurs with a high degree of similarity in the same anatomical body part of multiple patients. Typical landmarks are for example the epicondyles of a femoral bone or the tips of the transverse processes and/or dorsal process of a vertebra. The points (main points or auxiliary points) can represent such landmarks. A landmark which lies on (in particular on the surface of) a characteristic anatomical structure of the body part can also represent said structure. The landmark can represent the anatomical structure as a whole or only a point or part of it. A landmark can also for example lie on the anatomical structure, which is in particular a prominent structure. An example of such an anatomical structure is the posterior aspect of the iliac crest. Other landmarks include a landmark defined by the rim of the acetabulum, for instance by the centre of the rim. In another example, a landmark represents the bottom or deepest point of an acetabulum, which is derived from a multitude of detection points. Thus, one landmark can in particular represent a multitude of detection points. As mentioned above, a landmark can represent an anatomical characteristic which is defined on the basis of a characteristic structure of the body part. Additionally, a landmark can also represent an anatomical characteristic defined by a relative movement of two body parts, such as the rotational centre of the femur when moved relative to the acetabulum. A landmark may also be defined for a soft tissue structure. For example, the boundary between the right upper and lower lung or the centre line of the occipital, parietal and frontal lobes of the brain may serve as a landmark.

Furthermore, the third image data is registered with fourth image data in order to determine second co-registered image data. Registering the third image data with the fourth image data may be done in the same or a similar manner as registering the first image data with the second image data.

The first, second, third and fourth image data are advantageously determined by applying the inventive image data processing method for determining the tissue distribution in image data taken from the patient. The inventive image data processing method may be used to generate first to fourth image data which most probably resemble the true distribution of tissues in the body region at the first and second point in time, respectively. Preferably, the inventive image data processing method for determining the tissue distribution is used for segmentation, in particular automatic segmentation of the image data taken from the patient in order to obtain the first to fourth image data.

Advantageously, the inventive image data processing method for determining the tissue distribution is applied alternatively or additionally to the first and second co-registered image data. In this case, the first to fourth image data are preferably provided as raw image data without further processing as to the tissue distribution which they resemble. The first to fourth image data are then co-registered and the first and second co-registered image data are then used as the image data which is provided for determining the tissue distribution.

Preferably, the first co-registered image data and the second co-registered image data are prepared for a comparison with each other. In particular, the first and second co-registered image data may have to be transformed into a common coordinate system in order to allow a visual comparison of the two sets of co-registered image data. When comparing the first and second co-registered image data with each other, a difference in geometry of the body region between the first co-registered image data and the second co-registered image data is preferably determined. The difference in geometry is advantageously quantified (for example, by visual and/or acoustic output of a numeric value to a user) and/or visually marked on a display device (for example, by displaying outlines of the geometric regions and/or representing a deviation in the outlines from one another by marking the deviation—in particular by using an arrow or a highlighted distance vector).

The difference in geometry is preferably quantified by morphometrics of the body region (i.e. quantities which describe the geometric appearance of the body region), in particular by at least one out of volume, diameter and cross-sectional area of at least one structure described by the image information and/or by relative difference of those quantities between the first and second point in time (i.e. between the first co-registered image data and the second co-registered image data).

The above-mentioned visual marking of the difference in geometry may be carried out in accordance with the determined quantity of the difference, for example a colour highlighting of the visual marking may change for different numeric values determined for the quantity of the difference.

Most preferably, the first imaging modality and the second imaging modality are two different imaging modalities which are selected from the group of magnetic resonance tomography (or magnetic resonance imaging, respectively), computed tomography (CT), positron emission tomography, x-ray or x-ray tomography and sonography. The term of imaging modality may in the following also denote one out of different MR-modalities (such as T1+c, T1−c, T2/FLAIR, MR-based perfusion imaging, MR-based angiography, T1, functional MRI—fMRI, diffusion tenser imaging—DTI) and/or one out of x-ray- or CT-based imaging modalities (such as CT-based perfusion imaging or CT-based angiography) or PET/SPECT.

The second co-registered image data is advantageously determined by using an image fusion algorithm, in particular a rigid (image) fusion algorithm. In this application, the term "image fusion" is also used as an alternative to the term "image morphing", but with the same meaning.

Image morphing transformations are in particular designed to enable a seamless transition from one image to another image. The transformation is in particular designed such that one of the first and second images is deformed, in particular in such a way that corresponding structures (in particular, corresponding image elements) are arranged at the same position as in the other of the first and second images. The deformed (transformed) image which is transformed from one of the first and second images is in particular as similar as possible to the other of the first and second images. Preferably, (numerical) optimisation algorithms are applied in order to find the transformation which results in optimum similarity. The degree of similarity is preferably measured by way of a measure of similarity (also referred to in the following as a "similarity measure"). The parameters of the optimisation algorithm are in particular vectors of a deformation field F. These vectors are determined by the optimisation algorithm which results in optimum similarity. Thus, optimum similarity represents a condition, in particular a constraint, for the optimisation algorithm. The bases of the vectors lie in particular at voxel positions of one of the first and second images which is to be transformed, and the tips of the vectors lie at the corresponding voxel positions in the transformed image. A plurality of these vectors are preferably provided, for instance more than twenty or a hundred or a thousand or ten thousand, etc. Preferably, there are (further) constraints on the transformation (deformation), in particular in order to avoid pathological deformations (for instance, all the voxels being shifted to the same position by the transformation). The constraints include in particular the constraint that the transformation is regular, which in particular means that a Jacobian determinant calculated from a matrix of the deformation field (in particular, the vector field) is larger than zero. The constraints include in particular the constraint that the transformed (deformed) image is not self-intersecting, in particular that the transformed (deformed) image does not comprise faults and/or ruptures. The constraints include in particular the constraint that in case a regular grid is transformed. Simultaneously with the image and in a corresponding manner, then the grid is not allowed to interfold at any of its locations. The optimising problem is in particular solved iteratively, in particular by means of an optimisation algorithm which is in particular a first-order optimisation algorithm, in particular a gradient descent algorithm. Other examples for optimisation algorithms are optimisation algorithms which do not use derivations like the Downhill Simplex algorithm or algorithms which use higher order derivatives like Newton-like algorithms. Preferably, the optimisation algorithm performs a local optimisation. In case of a plurality of local optima, global algorithms like Simulated Annealing or Genetic Algorithm can be used. In case of linear optimisation problems, for instance the Simplex method can be used.

In the steps of the optimisation algorithms, the voxels are in particular shifted by a magnitude in a direction such that the degree of similarity is increased. This magnitude is preferably less than a predefined limit, for instance less than $\frac{1}{10}$ or $\frac{1}{100}$ or $\frac{1}{1000}$ of the diameter of the image, and in particular about equal to or less than the distance between neighbouring voxels. Due in particular to a high number of (iteration) steps, large deformations can be implemented.

The first to fourth image data preferably comprises body region information data comprising body region information about at least one anatomical and/or physiological property of the body region. Preferably, the category of anatomical and/or physiological information (also called "body region information") contained in the first and third image data is different from the category of the body region information contained in the second and fourth image data. For example, the category of anatomical and/or physiological information may relate to the type of tissue represented by the image information contained in the image data. Alternatively or additionally, the category may relate to physical parameters of the body region such as density and/or mechanical strength and/or permeability and/or perfusion. As an example, the category contained in the first and third image data may relate to the tissue type, whereas the second and fourth image data comprise information from the category of permeability. To this end, the first and second imaging modalities are different from one another and are most preferably selected on the basis of the category of body region information which should be represented by the image information.

Preferably, the first and second imaging modalities are selected according to the physical properties of the tissue contained in the body region and/or to the response which they can cause in the tissue contained in the body region. For example, an imaging modality may be used for hard tissue which is different from the imaging modality used for soft tissue. For example, an x-ray based imaging modality may be used for hard tissue and an MR-based imaging modality may be used for soft tissue.

Preferably, the first and second co-registered image data are used to create a time series of images of the body region, in particular a movie of the geometric and/or physiological development of the body region with time. In other words, a plurality of data displaying a most likely tissue distribution in the body region is combined over time for different, in particular at least two or a multitude of imaging modalities. This allows for a profound appreciation of the body region by combining the advantageous effects of each and all of the used imaging modalities. This aspect of the invention may in short be described as the following advantageous embodiments A to N and may referred to as an "image data processing method for determining geometric changes".

A. A method for processing image data comprising image information about a body region of a patient, the method being at least partly executed by an electronic data processing device and comprising the following steps:
   a) providing first image data determined, at a first point in time, by using a first medical imaging modality, the first image data comprising image information about the body region;
   b) providing second image data determined, at the first point in time, by using a second medical imaging modality, the second imaging modality being different from the first imaging modality and the second image data comprising image information about the body region;
   c) providing third image data determined, at a second point in time which is later in time than the first point in time, by using the first medical imaging modality, the third image data comprising information about the geometry of the body region;
   d) providing fourth image data determined, at the second point in time, by using the second medical imaging modality, the fourth image data comprising image information about the body region;
   e) determining first co-registered image data by registering the first image data with the second image data;
   f) determining second co-registered image data by registering the third image data with the fourth image data.

B. The method according to the preceding embodiment, further comprising a step of preparing the first co-registered image data and the second co-registered image data for a comparison with each other.

C. The method according to the preceding embodiment, further comprising a step of determining whether there is a difference in geometry of the body region between the first co-registered image data and the second co-registered image data.

D. The method according to the preceding embodiment, wherein the difference in geometry is quantified and/or visually marked on a display device.

E. The method according to any one of the preceding embodiments, wherein the difference is quantified by morphometrics of the body region, in particular by at least one out of volume, diameter and cross-sectional area of at least one structure described by the image information and/or by relative difference of those quantities between the first and second point in time.

F. The method according to any one of embodiments A to C or according to embodiment E, wherein a visual marking of the difference in geometry is carried out in accordance with a determined quantity of the difference.

G. The method according to any one of the preceding embodiments, wherein the first imaging modality and the second imaging modality are two different imaging modalities selected from the group of magnetic resonance tomography, computed tomography, positron emission tomography, X-ray and sonography.

H. The method according to any one of the preceding embodiments, wherein the second co-registered image data is determined by using a rigid fusion algorithm.

I. The method according to any one of the preceding embodiments, wherein the first to fourth image data further comprises body region information data comprising body region information about at least one anatomical and/or physiological property of the body region.

J. The method according to the preceding embodiment, wherein the body region information obtained from the first and third image data is of a category of anatomical and/or physiological information which is different from the category of the body region information obtained from the second and fourth image data.

K. The method according to any one of the preceding embodiments, wherein the first and second imaging modalities are selected according to the physical properties of the tissue contained in the body region and/or to the response which they cause in the tissue contained in the body region.

L. The method according to the previous embodiments, wherein the first and second co-registered image data are used to create a time series of images of the body region, in particular a movie of the geometric and/or physiological development of the body region with time.

M. The method according to any one of the preceding embodiments, wherein the second co-registered image data are provided as image data to the inventive image data processing method for determining tissue distribution, the method comprising a further step of determining at least one specific physical structures, in particular a tissue structure, represented by the image information contained in the second co-registered image data.

N. The method according to the preceding embodiment, comprising a step of comparing the geometric dimensions of the at least one physical structure determined in the further step of the preceding embodiment to the geometric dimensions of the comparable physical structure determined in the image information contained in the first co-registered image data.

The invention also comprises a program which, when running on a computer or when loaded onto a computer (a computer program), causes the computer to perform the inventive method, in particular the image data processing method for determining tissue distribution and/or the image data processing method for determining geometric changes. Furthermore, a program storage medium on which the program is stored (in particular in a non-transitory form) and/or a computer on which the program is running or into the memory of which the program is loaded and/or a signal wave, in particular a digital signal wave, carrying information which represents the program, wherein the aforementioned program in particular comprises code which is adapted to perform all the steps of the method as described above are part of the invention.

Within the framework of the invention, computer program elements can be embodied by hardware and/or software (this includes firmware, resident software, micro-code, etc.). Within the framework of the invention, computer program elements can take the form of a computer program product which can be embodied by a computer-usable or computer-readable storage medium comprising computer-usable or computer-readable program instructions, "code" or a "computer program" embodied in said medium for use on or in connection with the instruction-executing system. Such a system can be a computer; a computer can be a data processing device comprising means for executing the computer program elements and/or the program in accordance with the invention. Within the framework of the present invention, a computer-usable or computer-readable medium can be any medium which can include, store, communicate, propagate or transport the program for use on or in connection with the instruction-executing system, apparatus or device. The computer-usable or computer-readable medium can for example be, but is not limited to, an electronic, magnetic, optical, electromagnetic, infrared or semiconductor system, apparatus or device or a medium of propagation such as for example the Internet. The computer-usable or computer-readable medium could even for example be paper or another suitable medium onto which the program is printed, since the program could be electronically captured, for example by optically scanning the paper or other suitable medium, and then compiled, interpreted or otherwise processed in a suitable manner. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or vibration element incorporated into an instrument).

The present invention is also directed to a navigation system for medical use, in particular for use in radiation therapy. This navigation system preferably comprises the aforementioned computer for processing the data provided in accordance with the data processing method as described above. An irradiation device is preferably configured to emit a radiation beam (in particular, a beam of ionising radiation) such that the specific physical structure is irradiated. In particular, geometric features of the beam such as e.g. its direction and/or diameter are adapted to suit the dimensions and/or physical properties of the specific physical structure. Furthermore, the beam energy and/or intensity may be chosen in accordance with the location, dimension and tissue properties of the specific physical structure. To this end, the computer is provided with the information about the geometry and location of the specific physical structure in the patient's body or body region, respectively. The location of the specific physical structure is in particular determined relative to the device used for irradiating it (e.g., a particle accelerator or a high-energy x-ray tube). This relative position may be determined by using marker devices such as e.g. radioopaque markers for providing the image data containing information about the body region. The position of the radioopaque markers relative to predefined body parts of the patient is then advantageously known so that the patient's body may be adequately positioned relative to the irradiation device. Alternatively or additionally, optical markers which react to for example infrared or radio wavelength radiation may be used for positioning the patient's body if their position relative to a predefined part of the paient's body is known. The position of the marker devices is advantageously detected by a detection device such as a camera which is sensitive to IR radiation or an antenna array which operates on radio wavelengths of electromagnetic radiation.

In the following, embodiments of the present invention are described which are to be understood as descriptive and non-limiting embodiments.

Figure 1:
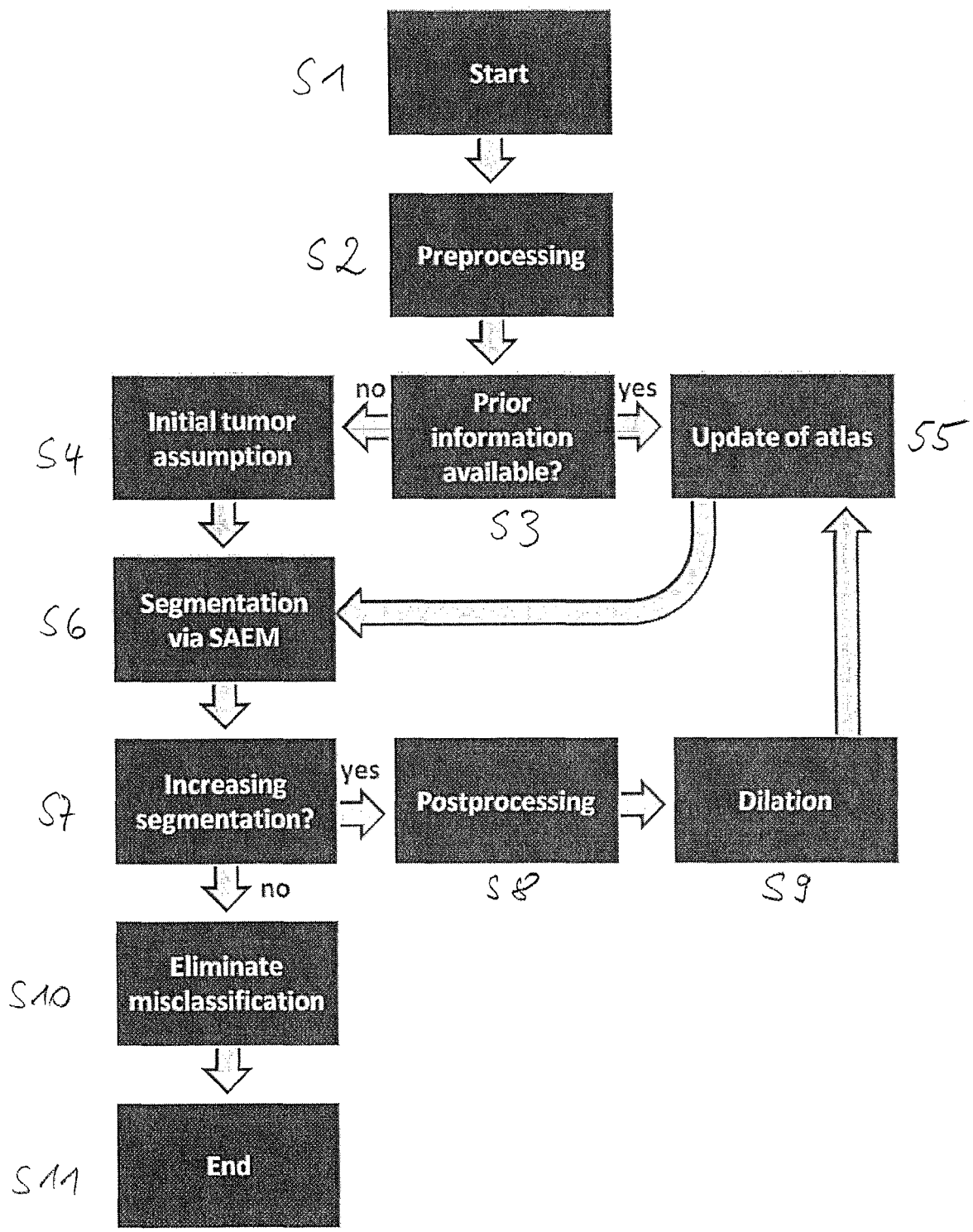
FIG. 1 is a flow diagram of the inventive tissue classification algorithm.

According to FIG. 1, the inventive image data processing method for determining tissue distribution follows a specific algorithm. The inventive method may be applied in tumour monitoring and has the advantage of robust segmentation of tumours, edemas and resection cavities in image data. The method uses spatial information of previous scans if available, however has the specific advantage of being able to run without such prior information. In step S1, the inventive method is started. In case the method is incorporated into a computer program, such a start instance may be implemented as calling for example an executable file which leads to execution of the inventive method. In step S3, it is determined whether prior information is available. As mentioned, such prior information may be gathered from previous scans (i.e. images) taken of the specific patient. If it is determined that no such prior information is available, the inventive method turns to step S4. In step S4, an initial tumour assumption is introduced. This initial tumour assumption corresponds to the step of assigning the predetermined probability. This probability represents the assumption that each image element underlies a specific, predefined and preferably low probability that the element represents tissue which belongs to a specific tissue class, in this case the class of tumour tissue. This probability may be for example 5% or 20% (i.e. 0.05 or 0.20) or lie in an interval with such boundaries. The initial tumour assumption is used as a start value for segmentation of the image in step S6.

Figure 2:
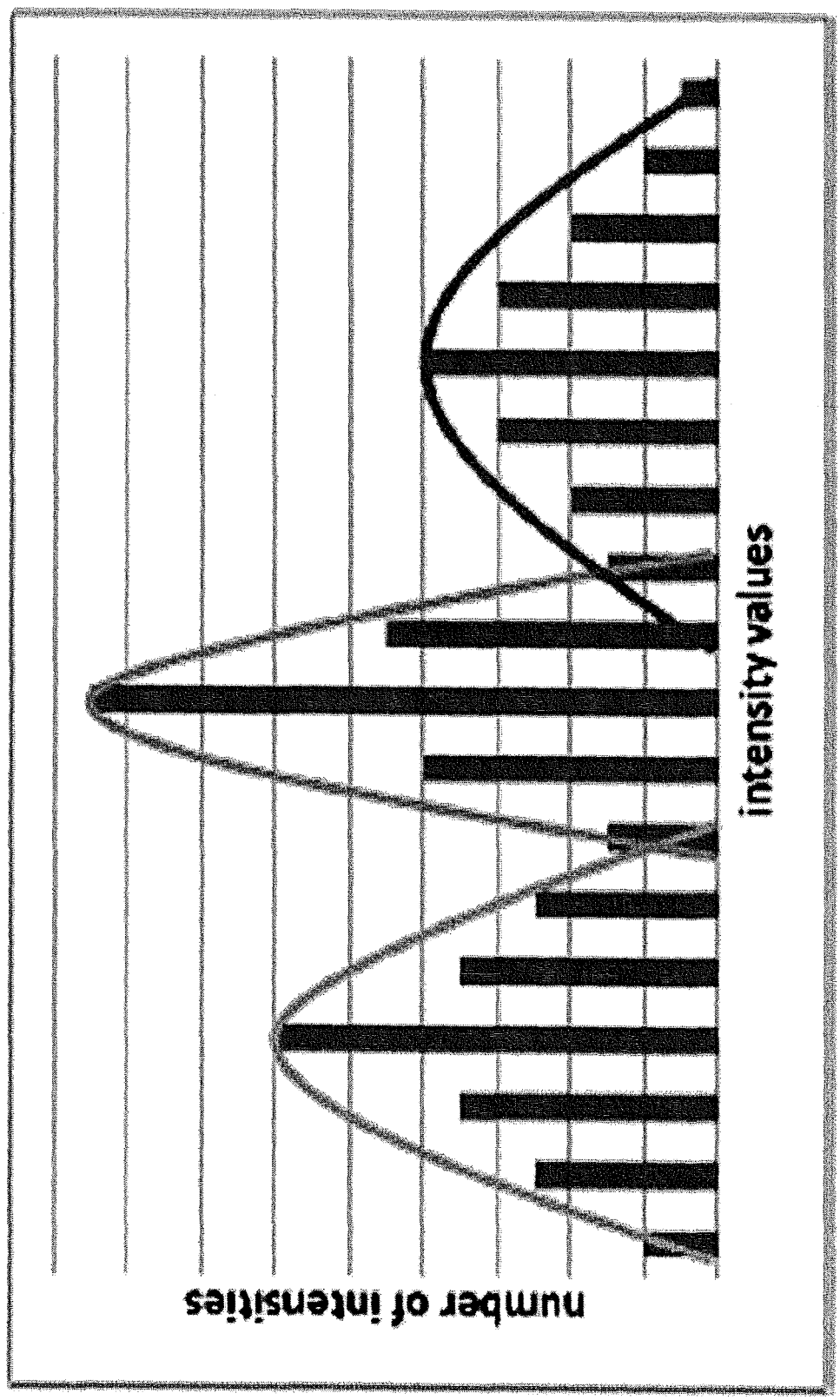
FIG. 2 shows fitting of Gaussian distributions to different intensity values contained in the image data.

Segmentation is preferably performed by an SAEM (simulated annealing expectation maximization) algorithm. An SAEM algorithm represents a combination of an expectation maximization (EM) algorithm and a stochastic expectation maximization (SEM) algorithm. The SAEM algorithm has the task of finding a tissue class to which each image element belongs. To this end, the image elements, in particular pixels, are grouped into classes of intensity values which are preferably determined from a colour value contained in each pixel. Such a histogram is shown in FIG. 2. For each intensity value, the pixels are counted which represent the respective intensity value.

Gaussian distributions are fitted to the intensity value histograms which best represent each one part of the histogram. The parts of the histogram to which a Gaussian is fitted may overlap or be disjunct, i.e. separate from one another, i.e. the Gaussian distributions may overlap one another or be disjunct from one another. The EM algorithm iteratively maximizes the combined probability of this model of Gaussian distributions, wherein the E-step (expectation step) provides an expectation of the segmentation to be achieved with a given model, and the M-step (maximization step) performs a maximization of the combined probability of this model.

In case step S3 determines that prior information is available, such prior information is used for updating an atlas of image information in step S5. In this case, the atlas consists purely of the data taken from the specific patient, the atlas may therefore also be denoted as a patient-specific atlas. This definition of an atlas therefore deviates from the standard definition given above. The patient-specific atlas is then used as a start information for the segmentation in step S6. According to the invention, the SAEM algorithm includes a stochastic expectation maximization (SEM) algorithm which includes an additional S-step (stochastic labelling step). The S-step sets the tissue affiliation (i.e. its correspondence to a certain tissue class) of each voxel "hard" (i.e. hard-coded) to one of the tissue classes. The following M-step then calculates the parameters of the Gaussians for each voxel belonging to one-and-only-one class (i.e. exactly one class in a unique manner). This is contrary to the normal EM algorithm, wherein each voxel has a certain fractional affiliation to any one of the available classes. This stochastic labelling is based on the posterior probability of the previous E-step. An example would be: If a voxel has a posterior probability of 80% for representing tissue type A and of 20% for representing tissue type B (wherein tissue types A and B differ from one another), it will be assigned with these probabilities to tissue type A and tissue type B, respectively. This additional S-step has a couple of advantages over the normal EM-algorithm, in particular better convergence, the ability to escape local optima and a reduced dependence on the start values.

An exemplary code snippet for the S-step written in C++ programming language is:

```
void EM::stochasticStep( )
{
    // clear intensities of each tissue class
    for (unsigned k=0; k<_tissue.size( ); k++)
        _tissue[k]->clearIntensities( );
    // associate each voxel to a tissue class according to posterior probability
    for (unsigned i=0; i<_intensities.size( ); i++) {
        unsigned label = _label[i] = stochasticClassAssociation
(i);
        _tissue[label]->addIntensity(_intensities[i]);
    }
}
```

In step S7, it is judged whether the segmentation already achieved in step S6 leads to an increasing image segmentation, in particular an increasing log-likelihood of the segmented image data. In a preferred embodiment, the log-likelihood conversion monitor is replaced by a simple difference calculation between the structure segmented in the current segmentation step and the previous segmentation step.

In case a log-likelihood conversion monitor is used for step S7, it is determined whether the log-likelihood increases or essentially no longer changes between consecutive iterations. If this is the case, step S7 follows the "no"-alternative into step S10. If the log-likelihood conversions monitor still changes, step S6 leads via the "yes"-alternative into step S8. The judgement whether the log-likelihood substantially has changed between the current segmentation result and the previous segmentation result may be carried out by determining whether an absolute or relative deviation of the log-likelihood value determined for the current segmentation step compared to the previous segmentation step exceeds a predefined threshold value, in particular a small relative increase having a value of for example 1% (i.e. 0.01).

Alternatively, an increase in segmentation may be determined in step S7 by determining a simple difference between the segmented structure resulting from the current segmentation in step S6 compared to the segmentation determined in the previous iteration of step S6. Also this difference may be expressed as an absolute or relative difference in segmentation between the two iterations of step S6. An end criterion for this step may for example be defined as a relative increase in segmented volume by less than 1% (i.e. 0.01). Studies have proven that this criterion enables the whole method to leave local optima (in which the preceding SAEM-run may have been stuck) and to head for the global optimum. If an increase in segmentation is determined in step S7, step S7 is exited while the "yes"-alternative in step S8. If an increase in segmentation is not determined in step S7, step S7 is exited via the "no"-alternative into step S10.

In step S8, the segmented image data undergoes post-processing, for example. Post-processing is implemented as morphologic opening followed by morphologic closing. The step of opening eliminates small isolated islands, i.e. advantageously the noise. The step of closing fills small cavities, i.e. advantageously eliminates the noise within the object (i.e. the region of interest) which in this case is given by in particular small holes. After post processing, the segmented image data undergoes dilation in step. Dilation means that the object or region of interest is grown by a small amount, preferably evenly in all directions. For example, the object is enlarged by adding to it all voxels which have distance of at most 2 mm to the (original) object. Post-processed and dilated image data is then used for updating the patient-specific atlas in step S5, whereafter the inventive method returns to step S6.

If step S7 is exited via the "no"-alternative into step S10, a step of eliminating misclassified image elements is entered. Such elimination may be implemented by a mask which is used to eliminate extracranial tissue. In particular, such a mask may be applied to image information representing the sinus sagittalis superior, sinus rectus or sinus transversus. This step comprises detecting and removing all the false positives. By focussing on connecting components and regarding all very small components as noise, such small components are removed. Removing the sinus breaks most bridges, creating more isolated small components which can in turn be removed. In the case of progression segmentation, any bright (and hence classified as tumor) structures can be removed, which are also bright at a previous point in time, but were not labelled as tumor there.

According to a further embodiment of the invention, the post-processing in step S8 may be implemented by manual post-processing including using an eraser tool on regions of interest which are selected by the user.

Once misclassified image elements have been eliminated, the image data processing method for determining tissue distribution ends in step S11.

Figure 3:
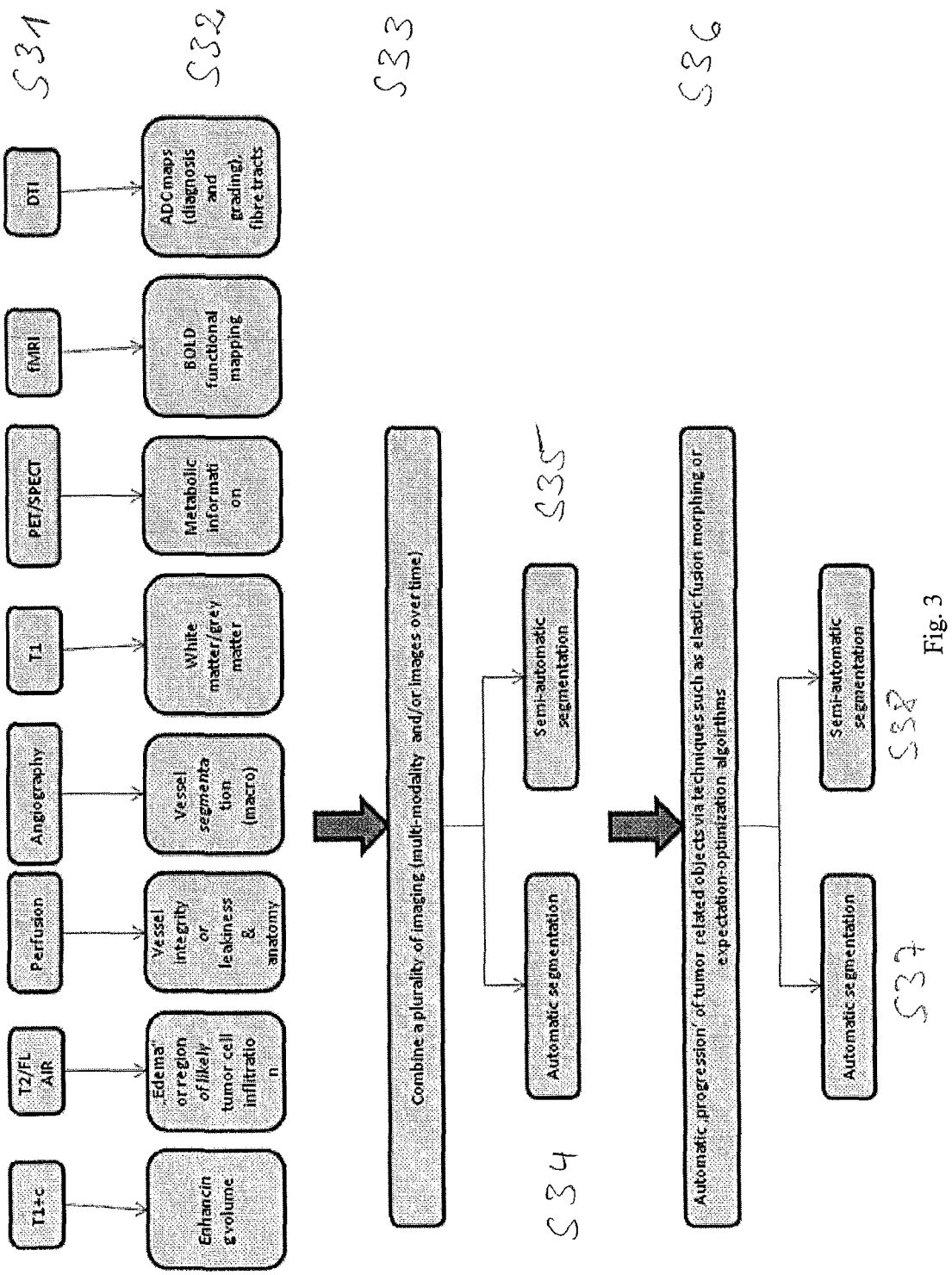
FIG. 3 is a flow diagram of an embodiment for combining multi-modality image data to be used as input image data.

FIG. 3 is a schematic flow diagram of the aspect of the invention relating to an image data processing method for determining geometric changes, in particular geometric changes of a specific physical structure represented by the image information about the body region of the patient. The specific physical structure in particular is a contiguous tissue structure, for example a cluster of soft or hard tissue (e.g., a tumour or part of a bone).

In step S31, different imaging modalities are applied to the specific patient or his body region (i.e. the region of interest), respectively. The image data received from a number, in particular at least two, more preferably at least three, imaging modalities may be selected in step S32 according to the anatomic and/or physiological information which the modalities are suitable to convey. The thus-chosen sets of image data are then combined in step S33, preferably by using the above-described fusion algorithm. In steps S34 and S35, the thus-combined image data, which are equivalent to the above-described first and second co-registered image data, are then segmented. According to step S34, an automatic segmentation takes place which does not require user interaction. Alternatively, a semi-automatic segmentation may be implemented as step S35. Semi-automatic segmentation requires user interaction which may be suitable in case the user wishes to have personal control over the segmenting process, in particular to control the body region which is to be segmented and/or to judge whether a sufficient segmentation result has already been reached at the specific iteration of the segmentation process.

The image segmentation in steps S34 or S35 may be implemented as the above-described image data processing method for determining tissue distribution. This then advantageously results in determining a certain area in the image which represent specific physical structures in the body region. For example, tumour-related objects may be automatically identified.

In step S36, such identified specific physical structures are then automatically progressed from the first co-registered image data to the second co-registered image data. This in particular comprises identifying the specific physical structures segmented in the first co-registered image data in the second co-registered image data. Such an automatic identification of physical structures may be achieved by techniques such as elastic fusion/morphing or again an expectation-optimization algorithm.

In steps S37 and S38, automatic or semi-automatic segmentation, respectively, of the second co-registered image data is then performed in order to gain information about the most likely tissue distribution represented by the co-registered image data, in particular using the boundary condition of known specific physical structures contained in the first co-registered image data.

Steps S37 and S38 may again be implemented as the above-described image data processing for determining tissue distribution.

Figure 4:
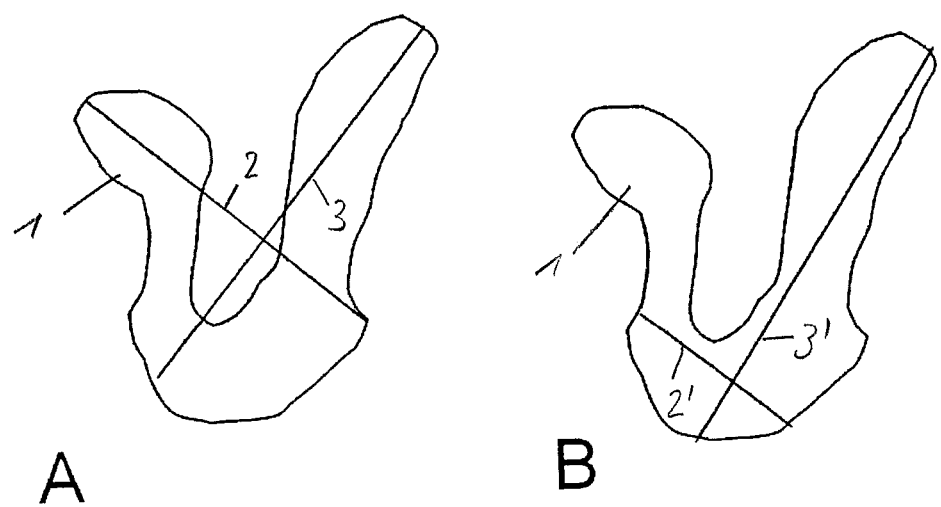
FIG. 4 is an illustration of the Macdonald criteria used for judging geometric changes of a structure in a body region.

FIG. 4 relates to an aspect of the image data processing method for determining geometric changes. Once a specific physical structure 1 has been identified in the first co-registered image data (cf. FIG. 4A), a user may delineate geometric features of this physical structure 1 such as length dimensions (so-called radii 2, 3) in the image. This is normally done by manual user interaction. The Macdonald criteria are then applied to the radii 2, 3 delineated in images of the same physical structure 1 taken at the first and second points in time. The Macdonald criteria relate to determining changes in the product of the maximum perpendicular diameters of such a physical structure 1 over time.

As shown in comparison of FIG. 4A with FIG. 4B, application of the Macdonald criteria may lead to delineating different radii depending on user choice. FIG. 4B shows another possibility for delineating radii 2', 3', which are obviously different in their placement and length when compared to the radii 2, 3 of FIG. 4A for the same physical structure 1.

The inventive method does not need to apply the Macdonald criteria in order to determine geometric variation of the physical structure 1. Rather, the dimensions of the physical structures 1 may be automatically determined from the image segmentation algorithm or the determined tissue distribution, respectively. The inventive method allows to determine such geometric variations in two or more, in particular in three dimensions.

A specific advantage of the inventive method is the fact that image noise and outliers are classified much better than when using a standard image data atlas. A further advantage of the aspect relating to the image data processing method for determining geometric changes is that the signal-to-noise ratio of the image data is increased by using multi-modality image data. This increase in the signal-to-noise ratio is due to the use of uncorrelated noise from different imaging modalities.

The invention claimed is:

1. A method for processing image data comprising image information about a body region of a patient, the method being executed by an electronic data processing device and comprising the following steps:
    a) providing the image data;
    b) assigning, to elements of the image information, a predetermined probability for the image information contained in the respective element representing a predetermined tissue class, wherein the predetermined probability is provided independently of information about at least part of a body which is different from the body of the patient, wherein the predetermined probability represents an expected value for the element-specific probability;
    c) determining, on the basis of the predetermined probability and for a subset of the image information comprising a plurality of the elements, an element-specific probability for individual elements of the subset representing an element-specific tissue class, wherein a likelihood for an individual element representing the element-specific tissue class is determined, wherein the likelihood is maximized by applying an expectation-maximisation algorithm, and wherein the likelihood is represented by a log-likelihood.

2. The method according to claim 1, wherein the predetermined probability is provided based on a result of tissue classification specific for the patient or is provided as a neutral value, in particular a value which is uniform for the elements.

3. The method according to claim 1, wherein assigning the predetermined probability is based on a specific image value of the respective element, in particular on colour information preferably comprising information about a grey value contained in the respective element.

4. The method according to claim 1, comprising a step of:
    d) determining, structural boundaries contained in the body region on the basis of the element-specific tissue class of individual elements of the subset, in particular on differences in element-specific tissue class for different elements.

5. The method according to claim 4 comprising a step of:
    e) determining whether the boundaries have undergone a variation with time.

6. A method for processing image data comprising image information about a body region of a patient, the method being executed by an electronic data processing device and comprising the following steps:
    a) providing the image data;
    b) assigning, to elements of the image information, a predetermined probability for the image information contained in the respective element representing a predetermined tissue class, wherein the predetermined probability is provided independently of information about at least part of a body which is different from the body of the patient;
    c) determining, on the basis of the predetermined probability and for a subset of the image information comprising a plurality of the elements, an element-specific probability for individual elements of the subset representing an element-specific tissue class;
    c1) determining a combined probability representing a distribution of conditional element-specific probabilities; and
    c2) repeating steps c) and c1) until the combined probability is maximised, wherein the element-specific probability determined in the preceding iteration of step c) is used as an expected value for the element-specific probability and a likelihood for the image information contained in the respective individual element representing the element-specific tissue class is determined.

7. A method for processing image data comprising image information about a body region of a patient, the method being executed by an electronic data processing device and comprising the following steps:

a) providing the image data;

b) assigning, to elements of the image information, a predetermined probability for the image information contained in the respective element representing a predetermined tissue class, wherein the predetermined probability is provided independently of information about at least part of a body which is different from the body of the patient;

c) determining, on the basis of the predetermined probability and for a subset of the image information comprising a plurality of the elements, an element-specific probability for individual elements of the subset representing an element-specific tissue class;

d) providing first image data determined, at a first point in time, by using a first medical imaging modality, the first image data comprising image information about the body region;

e) providing second image data determined, at the first point in time, by using a second medical imaging modality, the second imaging modality being different from the first imaging modality and the second image data comprising image information about the body region;

f) providing third image data determined, at a second point in time which is later in time than the first point in time, by using the first medical imaging modality, the third image data comprising information about the geometry of the body region;

g) providing fourth image data determined, at the second point in time, by using the second medical imaging modality, the fourth image data comprising image information about the body region;

h) determining first co-registered image data by registering the first image data with the second image data;

i) determining second co-registered image data by registering the third image data with the fourth image data.

8. The method according to claim 7, wherein the second co-registered image data are provided as image data in step a), the method comprising a further step of:

j) determining at least one specific physical structure, in particular a tissue structure, represented by the image information contained in the second co-registered image data.

9. The method according to claim 8, comprising a step of:

k) comparing the geometric dimensions of the at least one physical structure determined in step j) to the geometric dimensions of the comparable physical structure determined in the image information contained in the first co-registered image data.

10. A computer program product comprising a non-transitory computer readable medium encoded with an information processing program for use in an information processing device, wherein the program when executed performs the operations comprising:

a) providing the image data;

b) assigning, to elements of the image information, a predetermined probability for the image information contained in the respective element representing a predetermined tissue class, wherein the predetermined probability is provided independently of information about at least part of a body which is different from the body of the patient, wherein the predetermined probability represents an expected value for the element-specific probability;

c) determining, on the basis of the predetermined probability and for a subset of the image information comprising a plurality of the elements, an element-specific probability for individual elements of the subset representing an element-specific tissue class, wherein a likelihood for an individual element representing the element-specific tissue class is determined, wherein the likelihood is maximized by applying an expectation-maximisation algorithm, and wherein the likelihood is represented by a log-likelihood.

11. A navigation system used for tumour therapy comprising the computer program product according to claim 10.

12. A computer program product comprising a non-transitory computer readable medium encoded with an information processing program for use in an information processing device, wherein the program when executed performs the operations comprising:

a) providing the image data;

b) assigning, to elements of the image information, a predetermined probability for the image information contained in the respective element representing a predetermined tissue class, wherein the predetermined probability is provided independently of information about at least part of a body which is different from the body of the patient;

c) determining, on the basis of the predetermined probability and for a subset of the image information comprising a plurality of the elements, an element-specific probability for individual elements of the subset representing an element-specific tissue class;

c1) determining a combined probability representing a distribution of conditional element-specific probabilities; and c2) repeating steps c) and c1) until the combined probability is maximised, wherein the element-specific probability determined in the preceding iteration of step c) is used as an expected value for the element-specific probability and a likelihood for the image information contained in the respective individual element representing the element-specific tissue class is determined.

13. A navigation system used for tumour therapy comprising the computer program product according to claim 12.

14. A computer program product comprising a non-transitory computer readable medium encoded with an information processing program for use in an information processing device, wherein the program when executed performs the operations comprising:

a) providing the image data;

b) assigning, to elements of the image information, a predetermined probability for the image information contained in the respective element representing a predetermined tissue class, wherein the predetermined probability is provided independently of information about at least part of a body which is different from the body of the patient;

c) determining, on the basis of the predetermined probability and for a subset of the image information comprising a plurality of the elements, an element-specific probability for individual elements of the subset representing an element-specific tissue class;

d) providing first image data determined, at a first point in time, by using a first medical imaging modality, the first image data comprising image information about the body region;

e) providing second image data determined, at the first point in time, by using a second medical imaging modality, the second imaging modality being different from the first imaging modality and the second image data comprising image information about the body region;

f) providing third image data determined, at a second point in time which is later in time than the first point in time, by using the first medical imaging modality, the third image data comprising information about the geometry of the body region;
g) providing fourth image data determined, at the second point in time, by using the second medical imaging modality, the fourth image data comprising image information about the body region;
h) determining first co-registered image data by registering the first image data with the second image data;
i) determining second co-registered image data by registering the third image data with the fourth image data.

15. A navigation system used for tumour therapy comprising the computer program product according to claim 14.

* * * * *